July 28, 1970   D. R. CARDIS   3,522,132
APPARATUS FOR LAMINATING FABRICATING STOCK
Filed Oct. 23, 1965   4 Sheets-Sheet 4

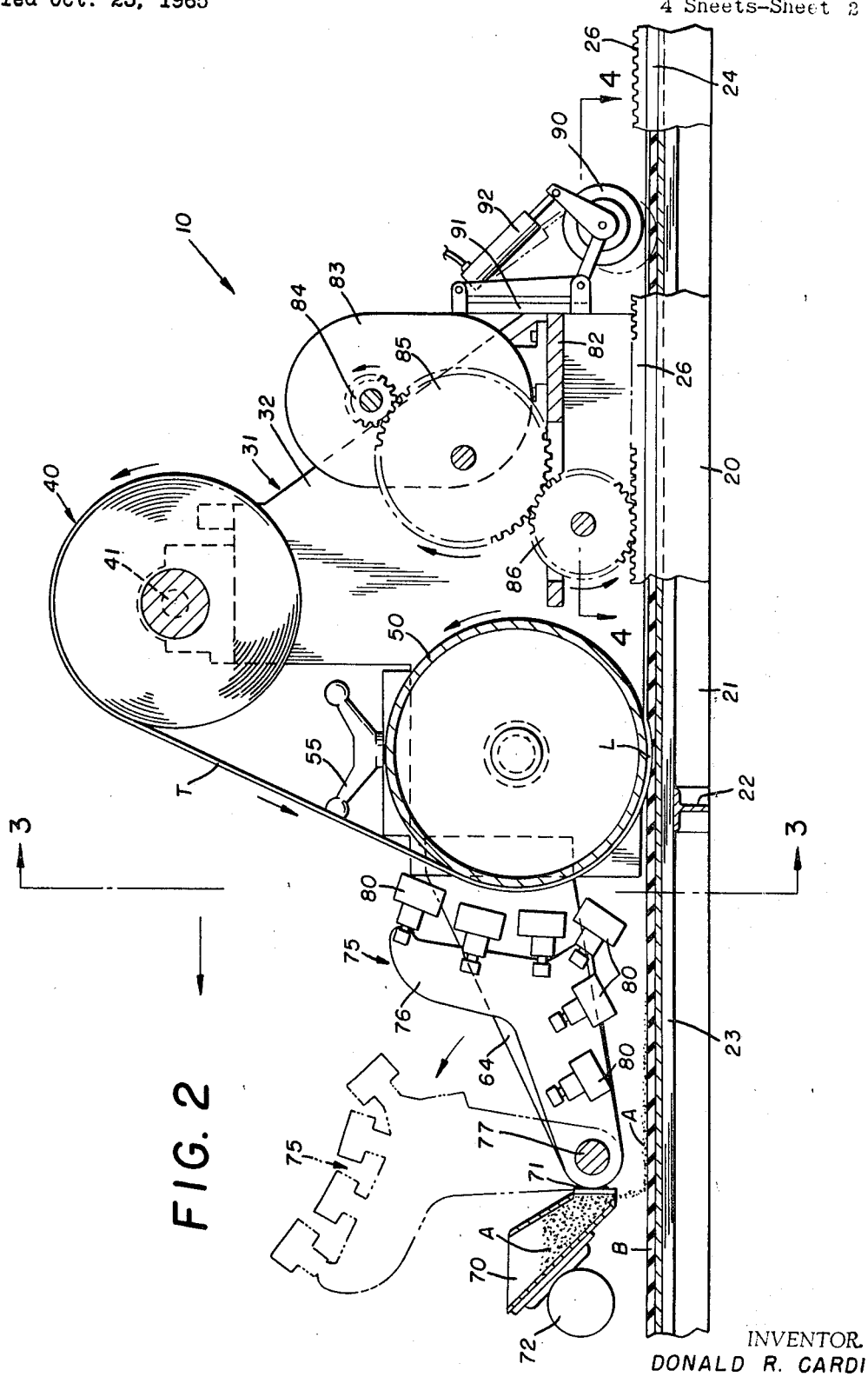
FIG. 2
INVENTOR.
DONALD R. CARDIS
BY 
ATTORNEYS

INVENTOR.
DONALD R. CARDIS
BY Freeman & Taylor
ATTORNEYS

United States Patent Office 3,522,132
Patented July 28, 1970

3,522,132
APPARATUS FOR LAMINATING FABRICATING STOCK
Donald R. Cardis, Stow, Ohio, assignor, by mesne assignments, to Becton, Dickinson and Company, a corporation of New Jersey
Filed Oct. 23, 1965, Ser. No. 502,828
Int. Cl. B32b *31/00*
U.S. Cl. 156—494                                       7 Claims

ABSTRACT OF THE DISCLOSURE

An apparatus for producing high wear floor coverings comprising a frame and support surface, a carriage movable longitudinally of said frame, a support for a roll of stock material rotatably carried by a pair of generally triangularly shaped end plates, a laminating roller, an adhesive reservoir and pivoted heating means for heating said adhesive and stock material.

---

This invention relates to the art of laminating equipment and in particular relates to an improved method and apparatus for adhesively laminating dissimilar materials together under pressure to result in a high wear component.

The art of lamination per se is generally well known and in the usual instance includes the steps of applying an adhesive substance between sandwiched layers, followed by heating of this substance to the appropriate fusion point, compressing pressure then being applied to produce a laminated product.

One particular field where lamination is particularly advantageous is the production of high wear floor covering that includes a foam base having laminated thereto a high wear top cover made of vinyl or similar material.

In laminating material of this type normal prior art knowledge would dictate that the requisite heat for lamination be applied through the top layer subsequent to the sandwiching of the layers together on opposed sides of the bonding substance.

It has been discovered that an improved rate of production can be obtained by employing apparatus that progressively applies the top layer material to a prepositioned bottom layer, with heat being applied simultaneously to the adhesive and the advancing underside of the top material, so as to preheat both the adhesive and abutting surfaces just prior to their point of contact for lamination.

By use of such preheating it has been discovered that lamination can be effectuated in a lesser amount of time so as to accordingly result in a lowered production cost.

It has also been found that use of a progressive application arrangement of the type aforesaid also provides the added advantage of permitting a trimming operation to be effectuated simultaneously with the laminating operation with the result that a completed product can be produced in one operation whereas the normal teaching of the prior art would indicate several independent operations for the purpose of preheating, pressurizing and trimming.

Production of an improved laminating apparatus achieving the above results accordingly becomes the principal object of this invention with other objects of the invention becoming more apparent upon a reading of the following brief specification, considered and interpreted in the light of the accompanying drawings.

Of the drawings:
FIG. 1 is a perspective view of the carriage portion of the improved laminating machine shown positioned in an overlying relationship to a segment of the overall support frame.

FIG. 2 is a vertical section taken on the lines 2—2 of FIG. 1.

Figure 1:
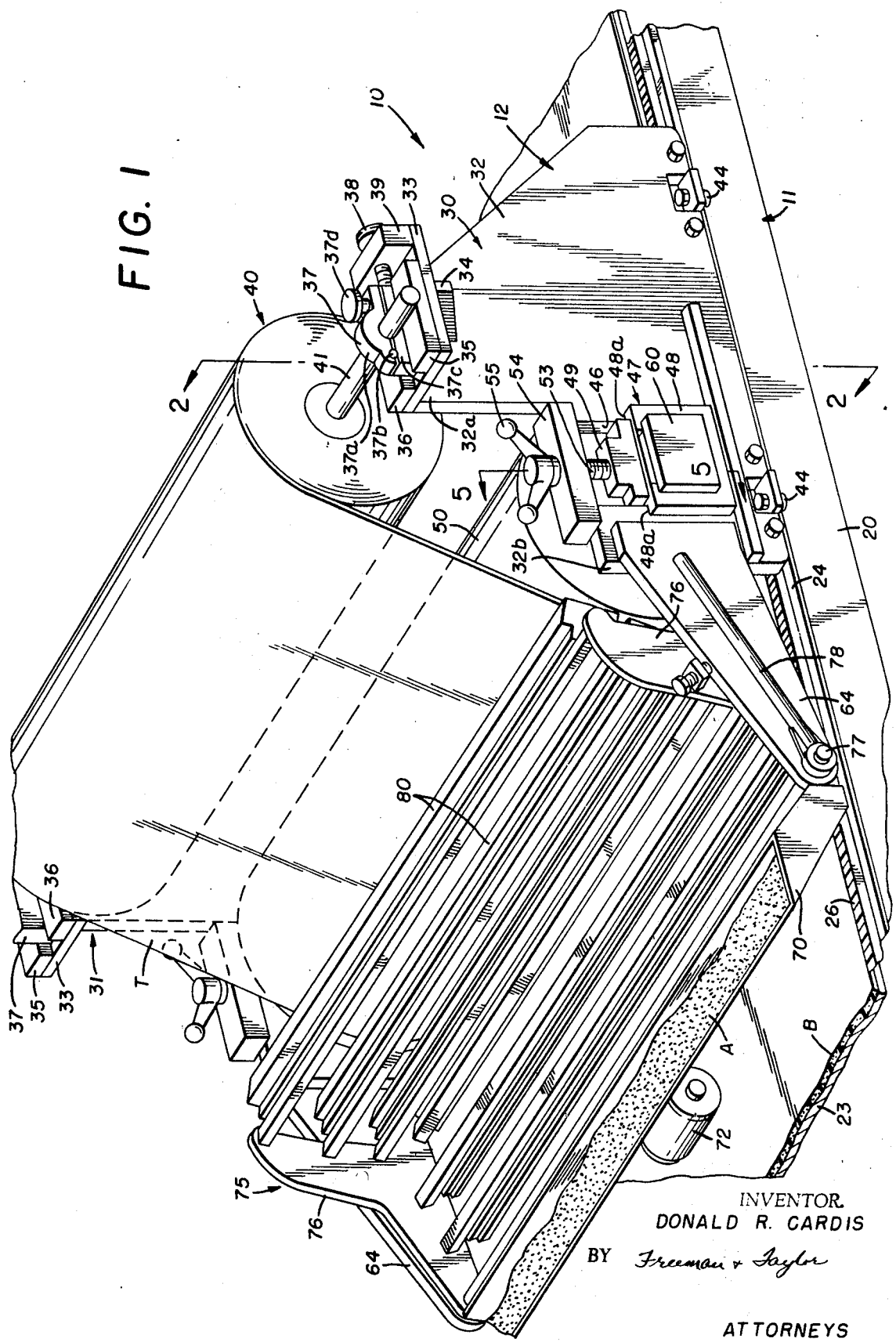

Referring now to the drawings and in particular to FIG. 1 thereof, the improved laminating machine, generally designated by the numeral 10, includes an elongate frame 11 and a reciprocal carriage member 12 with the arrangement being such that the frame 11 receives a long sheet of flat base material B, while the carriage 12 performs the multiple function of (1) supplying adhesive material to the top surface of base material B, (2) progressively delivering the top sheet material T in preheated condition to the base B, and (3) simultaneously trimming the edges of the laminated stock material to a given width, with such functions simutlaneously occurring during each "laminating" pass of the carriage 12 over the frame 11.

The frame 11 is generally of suitable structural framework and in practice would be of a length of anywhere from sixty or more feet to several hundred feet, although such length dimensions are not critical in view of the fact that the same only establish the length of laminated stock that can be made in any given pass of carriage 12 across frame 11.

Figure 3:
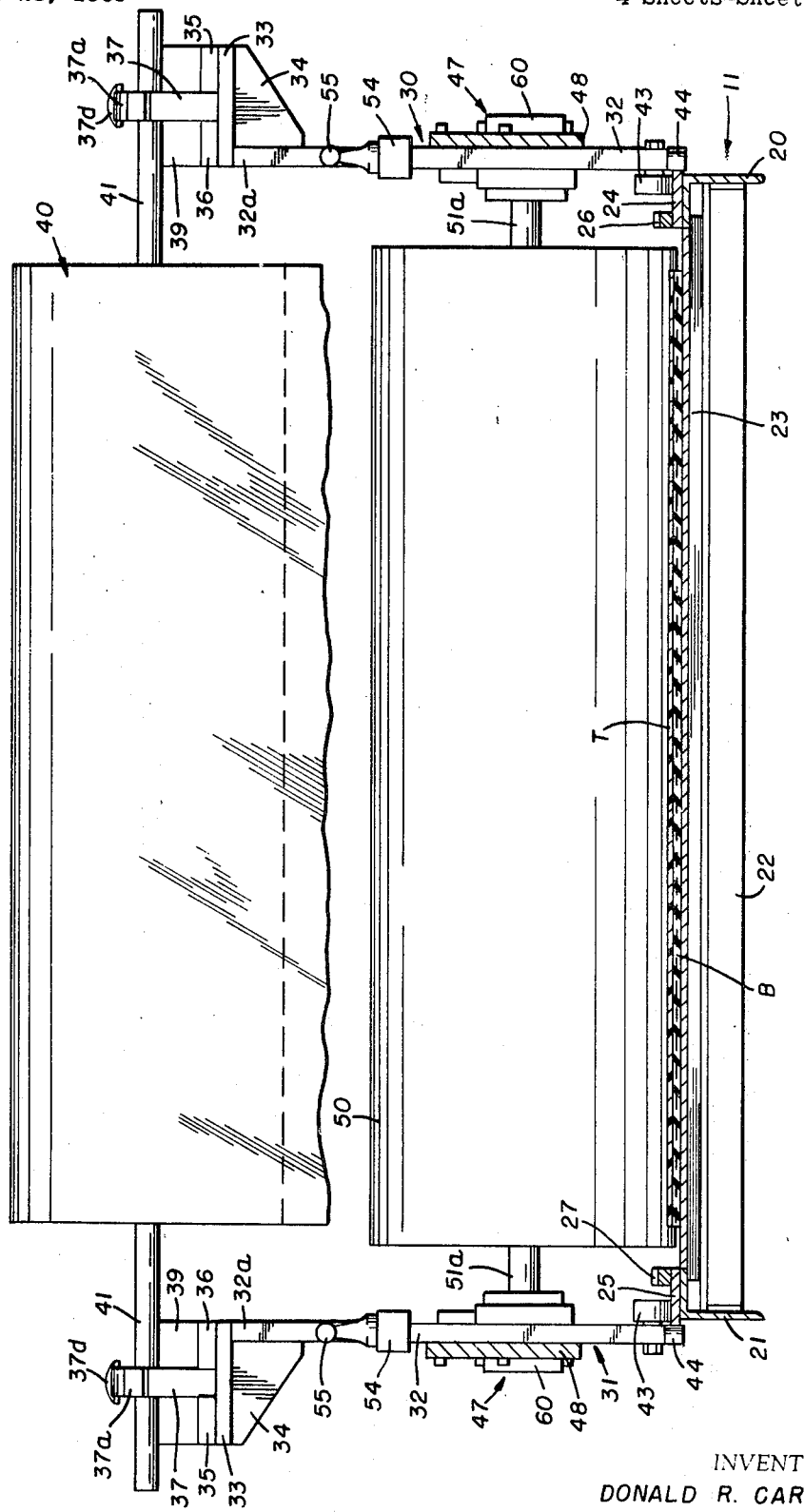
FIG. 3 is a vertical section taken on the lines 3—3 of FIG. 2.

Structurally, and referring to FIGS. 2 and 3, the frame 11 includes opposed side frames 20 and 21 appropriately braced by cross ties 22—22 and being provided with the usual legs (not shown) to support the same in elevated condition above the floor.

Cross ties 22—22 serve further to support a series of platform members 23—23 with the edges of such members being clamped between the ties 22—22 and the opposed frame members 20 and 21 by the usual fastening means that clamp the members 23—23 in place for the purpose of supporting the base stock B thereon as clearly shown in FIG. 1.

Also, and again referring to FIGS. 1, 2, and 3, the opposed frames 20 and 21 further include elongate guide plates 24 and 25 respectively, with each such guide plate serving the dual function of (1) supporting the rotatable elements of the carriage 12, and (2) serving as a point of location for opposed gear racks 26 and 27.

Turning next to FIG. 1, the carriage 12 is generally of triangular shaped configuration in side elevation and, accordingly, includes opposed end plates that are generally designated by the numerals 30 and 31, with the structure of these end plate assemblies being identical except for the fact that the same are opposite hand. Accordingly, and referring to FIG. 1, each end plate assembly 30 and 31 includes a main end plate 32 that has its apex portion 32a provided with a support plate 33 that is supported against horizontal deflection by a web 34. A pair of guide plates 35 and 36 are fastened in known fashion to the plate 33 and serve as a guideway for a support block 37 that rotatably supports the axle 41 of stock roll 40 as clearly shown in FIG. 1.

Adjustment of block 37 with respect to plate 33 is achieved by the use of actuating handle 38 that is threadingly received in control block 39 and support block 37, with the arrangement being such that rotation of handle 38 results in reciprocation of block 37 in the guideway between guide plates 35 and 36.

To facilitate removal of the stock roll 40 from the block 37, the latter is shown being of split construction as shown in FIG. 1, with the upper half 37a being hinged as at 37b to the lower half 37c, and with locking handle 37d serving as a quick release to permit encirclement of the axle 41 as shown in FIG. 1.

Turning next to FIG. 3, the lower edge of each end plate 32 is shown rotatably supporting a first series of guide rollers 43, 43 as well as a second series of guide rollers 44, 44 that bear against the outboard edge of the guide members 24 and 25 as clearly shown in FIG. 3. In this fashion the rollers 44, 44 prevent side to side movement of carriage 12 with respect to frame 11, while the rollers 43, 43 provide rolling support for the carriage 12 on frame 11.

Figure 5:
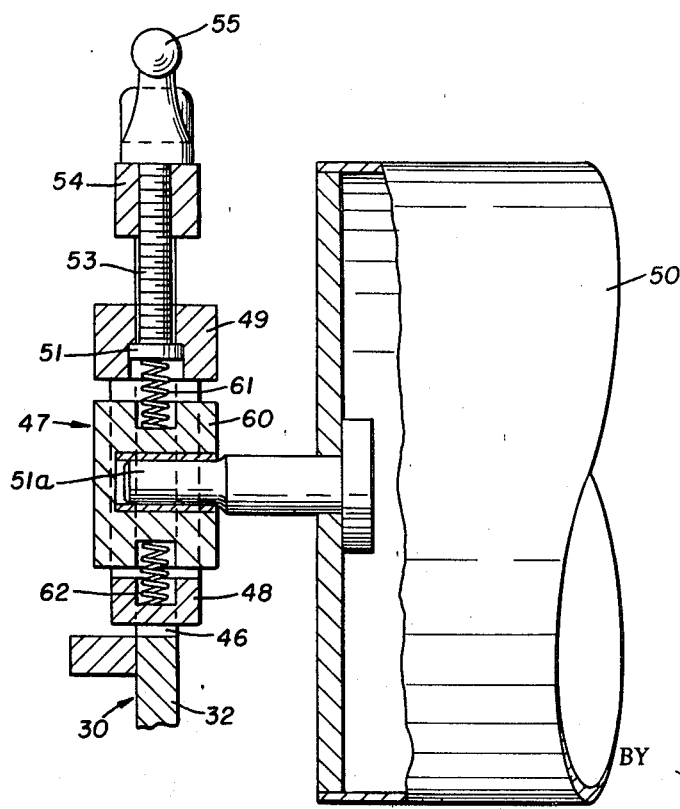
FIG. 5 is a vertical section taken on the lines 5—5 of FIG. 1.

Turning now to the manner in which the laminating roll 50 is supported it will first be noted that each end plate 32 has a vertical slot or guideway 46 provided therein for reception of a journal bearing unit 47, with the construction of journal bearing unit 47 being best shown in FIG. 5 of the drawings. In this regard, the unit 47 includes a main block 48, provided with appropriate opposed slots 48a, 48a that engage the opposed walls of slot 46 so as to permit limited reciprocation of block 48 with respect to slot 46. In this regard, a top block 49 is secured to the upper edge of main block 48 and threadingly receives the enlarged head 51 of an actuating screw 53, with the screw 53 being threaded through guide block 54 so as to facilitate raising or lowering of unit 47 upon rotation of handle 55 in the appropriate direction (see FIG. 5).

Again referring to FIGS. 1 and 5, it will be noted that a bushing 60 is supported within the boundaries of blocks 48 and 49 with bushing 60 being located by opposed springs 61, 62 so as to rotatably receive the shaft end 51a of the laminating roller 50 as clearly shown in FIG. 5 of the drawings.

As a result of the aforesaid arrangement it will be noted that the laminating roller is always tensionally urged into contact with the bed portion of the frame with adjustment as to the extent of such pressure being possible by virtue of the handle 55.

Again referring to FIGS. 1 and 2, the forward edge 32a of each end frame has secured thereto, in projecting relationship, a pair of opposed triangular shaped support arms 64, 64, with the purpose of these projecting support arms 64, 64 being to support the heat and adhesive supply mechanisms that will now be described, with these members 64, 64 being welded or otherwise secured to frames 32, 32 in known fashion.

In this regard, and referring now to FIG. 2, it will be noted that a hopper member 70 is shown secured, as by weld 71, to the leading edge of arms 64, 64, with the usual motor 72 being provided to activate the hopper and discharge the contents from it much in the manner schematically illustrated in FIG. 2.

A heating element assembly, generally designated by the numeral 75 is also shown supported by the opposed support plates 64, 64.

It is preferred that the over-all assembly 75 be moved as a unit relatively of the support arms 64, 64 and to this end the heating unit 75 includes appropriately contoured end plates 76, 76 that are supported in transversely spaced relationship to each other by virtue of being connected to shaft 77. Shaft 77 is in turn journaled, at its opposed ends, within appropriate openings in arms 64, 64. By this arrangement a handle 78 can be keyed to the projecting end of shaft 77 so as to permit positioning of the unit 75 in either the active position shown in full lines in FIG. 2, or the inactive or retracted position shown in chain dotted lines in FIG. 2.

It is believed apparent that such an arrangement permits easy withdrawal for access purposes when required.

Elongate heating tubes, generally designated by the numerals 80, 80 are shown extending transversely between the end plates 76, 76 with these heating lamps being arranged in vertical and horizontal banks so as to preheat top material T as it emits from the stock roll 40 while simultaneously preheating the adhesive A and the top surface of base B. Thus the top material T, adhesive A, and the base B are preheated to fusion point just prior to contact therebetween.

In addition to the aforementioned component parts, the carriage frame further includes a transversely extending support plate 82 that supports a motor unit 83 having a drive gear 84. A reduction gear 85 transmits power from gear 84 to drive gear 86 that in turn meshes with the gear racks 26 and 27 that have been previously described, with the gearing arrangement just described being best shown in FIGS. 2 and 4 of the drawings and with such arrangement serving to provide means for propelling the carriage member 12 along the longitudinal extent of table 11.

Figure 4:
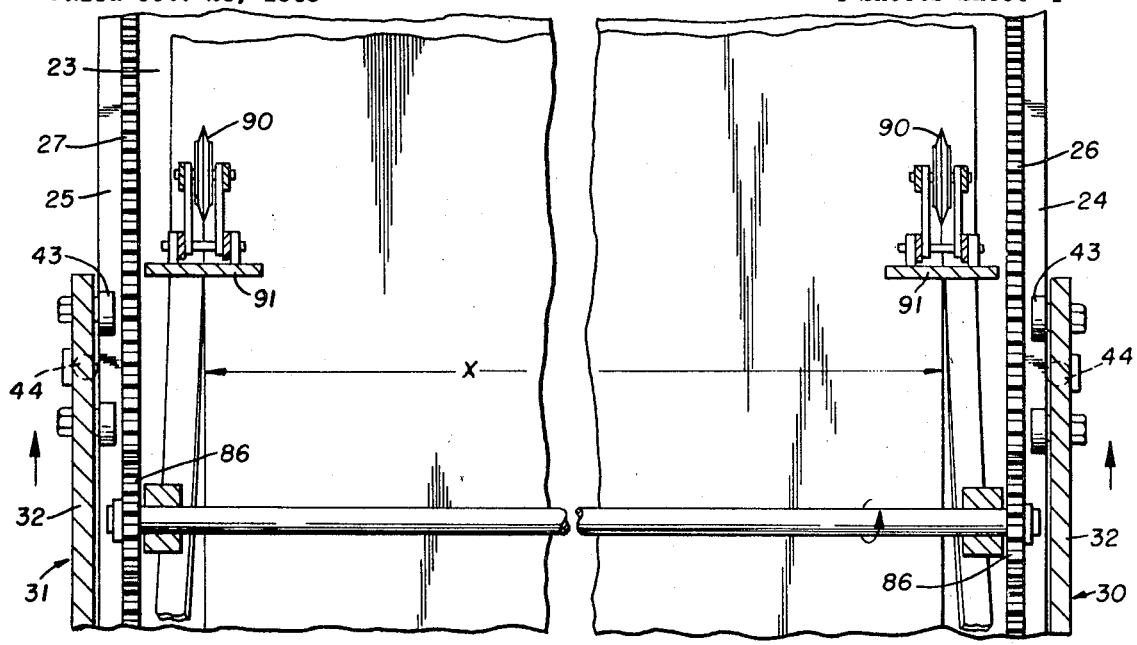
FIG. 4 is a horizontal section taken on the lines 4—4 of FIG. 2.

The remaining component element of the laminating machine being described, relates to the provision of opposed cutting knives 90, 90, that are best shown in FIGS. 2 and 4 of the drawings. In this regard and referring to FIG. 4, upright support plates 91, 91 serve to pivotally support the cutting knives 90, 90 in trailing relationship to carriage 12. Hydraulic cylinders 92, 92 are employed in known fashion to move the cutting knives 90, 90 between the full and chain dotted line positions of FIG. 2.

It is believed apparent that these cutting knives 90, 90 will trim the material to the requisite width "X" as clearly shown in FIG. 4 of the drawings, during the "laminating" pass, with the knives 90, 90 then being retracted during the return stroke of carriage 12.

In use or operation of the improved laminating machine it will first be assumed that the component parts have been assembled to the condition shown in the drawings.

At this time the operator need merely operate the motor 83 in the appropriate direction necessary to move the carriage 12 to one end of table 11 in preparation for a "laminating" pass. Prior to such time the operator will have placed a sheet of foam material B of appropriate dimension on the table 23 and will have secured the longitudinal ends of this material with respect to the longitudinal ends of the table so as to prevent slippage.

At this time the handle 78 can be operated to move the heating unit 75 to the retracted position of FIG. 2, following which top stock material T can be advanced beneath the roller 50 and rearward for the purpose of securing the edge of the same with respect to one longitudinal end of the table to thus preclude slipping.

At this time the heating unit may be returned to the operative position shown in full lines in FIG. 2, whereupon the "laminating" pass may be begun by operation of the motor 83.

Considering FIG. 2 it will be noted that adhesive A is being deposited on the base B in advance of the point of lamination that is designated by the numeral L in FIG. 2. This material, as well as the base B, is then progressively heated by the horizontal bank of lamps 80, 80 that are passing over the same so that by the time the same reaches the point of lamination L, the material will have been preheated to the appropriate degree for fusion.

During this same period of time the vertically arranged bank of lamps 80, 80 will have been preheating the advancing portions of the stock material S with the result that as the layers and adhesive meet at the point of lamination L, the same have been preheated to their appropriate fusion temperature for proper adhesion.

This results in a superior bond following the application of laminating pressure by the roller 50.

All during the time period aforesaid the knives 90, 90 will have been cutting the edge surface to the width "X" of FIG. 4 so that when the "laminating" pass is finished, the end result is a completely finished product that may simply be removed from the laminating table following detachment of the end connections previously described.

At this time the knives 90, 90 may be retracted, following which a new sheet of base material B may be positioned.

During the return stroke it has been found that the hopper 70 can be operated to discharge adhesive onto the top surface of the base material B. Dependent upon the particular adhesive used, this coat may serve as a precoat or as a final coat with resumption of another cycle being possible upon reaching the end of the return stroke above described.

With reference to the composition of the materials employed for laminating in accordance with the teachings aforesaid, it is first believed apparent that the general principles herein disclosed are capable of being utilized with a wide range of sheet material as well as a wide range of adhesive bonding material.

In connection with the preferred embodiment however, wherein a vinyl layer is bonded over a foam base, it has been found that the use of a powdered resin for the adhesive substance produces particularly desirable results in that the same is adapted to be readily dispersed from the hopper 70.

Further, resins such as a low molecular thermoplastic vinyl acetate resin possess the further property of being nonvolatile so as to eliminate entrapment that often occurs in the use of solvent base adhesives.

Other adhesive substances however can be used in accordance with the broad teachings of this invention.

While a full and complete description of the invention has been set forth in accordance with the dictates of the patent statutes, it is to be understood that the invention is not intended to be limited to the precise embodiment shown herein for the purpose of illustration.

What is claimed is:
1. A laminating machine, comprising:
   (A) an elongate frame;
   (B) an elongate support surface
      (1) defined by said frame, and
      (2) being adapted to support a length of sheet material in flat condition thereon;
   (C) a carriage;
   (D) guide means
      (1) interconnecting said carriage and said frame and
      (2) guiding said carriage longitudinally of said frame in reciprocal advancing and retracting movement along said support surface;
   (E) a pair of generally triangularly shaped end plates projecting upwardly from said carriage at opposed points on the longitudinal edge of said elongate frame;
   (F) a support for a stock roll
      (1) rotatably carried by said end plates in elevated relationship to said support surface
      (2) and adapted to deliver stock materials onto said support surface during advancement of said carriage across said support surface;
   (G) a laminating roller
      (1) rotatably carried by said end plates in close proximity with said support surface
      (2) directing stock emitted from said stock roller into overlying engagement with said sheet material;
   (H) means for urging said roller toward said support surface and applying laminating pressure to said stock and said sheet material following said engagement therebetween;
   (I) a reservoir for a dry adhesive
      (1) carried by said end plates forwardly of said laminating roller and
      (2) adapted to discharge adhesive onto said sheet material prior to overlaying thereof by said stock material during advance of said carriage;
   (J) and heating means carried by said end plates between said adhesive reservoir and said laminating roller and adapted to preheat said applied adhesive and said stock material prior to contact therebetween for laminating purposes.

2. The device of claim 1 further characterized by the fact that said heating means include a first bank of heating elements arranged in substantially vertical condition and a second bank of heating elements arranged in substantially horizontal position.

3. The device of claim 2 further characterized by the fact that at least one of said heating lamps is disposed in close proximity with the point of application of laminating pressure.

4. The device of claim 1 further characterized by the fact that said heating means may be pivoted into and out of heat imparting relationship with respect to said adhesive and said stock.

5. The device of claim 1 further characterized by the presence of means for adjusting the tension in said emitting stock material.

6. The device of claim 1 further characterized by the presence of drive means carried by said carriage and said frame adapted to propel said carriage across said frame in overlying relationship to said support surface.

7. The device of claim 1 further characterized by the presence of cutting knives carried by said carriage on the opposite end thereof from said adhesive means and being movable into and out of engagement with said sheet material.

References Cited

UNITED STATES PATENTS

| 2,890,147 | 6/1959 | Pearson et al. | 156—283 |
| 3,097,986 | 7/1963 | Kauer | 156—577 XR |
| 3,133,850 | 5/1964 | Alenius | 156—558 |
| 3,239,399 | 3/1966 | King | 156—497 XR |

JOHN T. GOOLKASIAN, Primary Examiner

H. F. EPSTEIN, Assistant Examiner

U.S. Cl. X.R.

156—499, 510, 523, 577